(12) United States Patent
Murthy et al.

(10) Patent No.: US 11,759,833 B2
(45) Date of Patent: Sep. 19, 2023

(54) METHOD AND APPARATUS FOR PASTEURIZATION, HYDROLYSIS AND CARBONIZATION

(71) Applicant: D.C. Water & Sewer Authority, Washington, DC (US)

(72) Inventors: Sudhir N. Murthy, Herndon, VA (US); Matthew Higgins, Lewisburg, PA (US); Haydee De Clippeleir, Washington, DC (US); Bernhard Wett, Innsbruck (AT)

( * ) Notice: Subject to any disclaimer, the term of this patent is extended or adjusted under 35 U.S.C. 154(b) by 232 days.

(21) Appl. No.: 17/163,844

(22) Filed: Feb. 1, 2021

(65) Prior Publication Data
US 2021/0214257 A1 Jul. 15, 2021

Related U.S. Application Data

(62) Division of application No. 15/713,278, filed on Sep. 22, 2017, now abandoned.
(Continued)

(51) Int. Cl.
*B09B 3/40* (2022.01)
*C02F 1/02* (2023.01)
(Continued)

(52) U.S. Cl.
CPC .................. *B09B 3/00* (2013.01); *B09B 3/40* (2022.01); *C02F 1/025* (2013.01); *C02F 11/04* (2013.01);
(Continued)

(58) Field of Classification Search
CPC ......... C02F 11/18; C02F 11/04; C02F 11/185; C02F 1/025; C02F 2209/02;
(Continued)

(56) References Cited

U.S. PATENT DOCUMENTS 6,113,789 A 9/2000 Burke
2002/0185456 A1 12/2002 Ward
(Continued)

FOREIGN PATENT DOCUMENTS

WO WO 2015097254 7/2015
WO WO 2015097254 A1 7/2015
(Continued)

OTHER PUBLICATIONS

Markis et al., "Rheological Characterisation of Blends of Primary and Secondary Sludge." Sep. 2013, https://www.researchgate.net/publication/283571769_Rheological_Characterization_of_blends_of_Primary_and_Secondary_Sludge.
(Continued)

*Primary Examiner* — Pranav N Patel
(74) *Attorney, Agent, or Firm* — Blank Rome LLP

(57) ABSTRACT

This invention proposes the use of Thermal Hydrolysis (or Thermal Carbonization) at different temperatures and pressures in alternate waste streams to achieve an optimal mix of high digestion rates and pasteurization rates while still achieving large viscosity reduction. In the disclosed embodiments means of combining Thermal Hydrolysis (or Thermal Carbonization) and Pasteurization including but not limited to placing the waste streams in parallel, placing them in series, utilizing heat input in parallel and heat exchangers in series are explored to optimize hydrolysis rates, minimize the use of high pressure tanks, optimize energy used, and manage viscosity characteristics of the solids.

2 Claims, 8 Drawing Sheets

Related U.S. Application Data

(60) Provisional application No. 62/398,936, filed on Sep. 23, 2016.

(51) Int. Cl.
  *C02F 11/10* (2006.01)
  *B09B 3/00* (2022.01)
  *C02F 11/18* (2006.01)
  *C02F 11/12* (2019.01)
  *C02F 11/04* (2006.01)

(52) U.S. Cl.
  CPC .............. *C02F 11/10* (2013.01); *C02F 11/12* (2013.01); *C02F 11/18* (2013.01); *C02F 11/185* (2013.01); *C02F 2201/009* (2013.01); *C02F 2209/09* (2013.01); *C02F 2303/04* (2013.01); *C02F 2303/10* (2013.01); *Y02W 10/37* (2015.05)

(58) Field of Classification Search
  CPC ........ C02F 2303/06; C02F 9/00; C02F 11/10; C02F 2001/007; C02F 2301/08; C02F 3/28; C02F 3/30; Y02W 10/10; Y02W 10/20
  See application file for complete search history.

(56) References Cited

U.S. PATENT DOCUMENTS

| | | |
|---|---|---|
| 2010/0255562 A1 | 10/2010 | Kang |
| 2011/0244541 A1 | 10/2011 | Zitomer |
| 2014/0251901 A1 | 9/2014 | Hojsgaard |
| 2014/0305865 A1 | 10/2014 | DiMassimo et al. |
| 2015/0232902 A1 | 8/2015 | Romero |
| 2015/0267963 A1 | 9/2015 | Aharon |
| 2016/0257592 A1 | 9/2016 | DiMassimo et al. |
| 2016/0326038 A1 | 11/2016 | Crampon |

FOREIGN PATENT DOCUMENTS

| | | |
|---|---|---|
| WO | 2016066752 A1 † | 5/2016 |
| WO | WO 2016066752 | 5/2016 |
| WO | WO 2016066752 A1 | 5/2016 |

OTHER PUBLICATIONS

Yang et al., "Variation in Humic and Fulvic Acids During Thermal Sludge Treatment Assessed by Size Fractionation, Elementary Analysis, and Spectroscopic Methods." Front. Environ. Sci. Eng., vol. 8(6), pp. 854-862, 2014, https://www.researchgate.net/publication/278134415_Variation_in_humic_and_fulvic_acids_during_thermal_sludge_treatment_assessed_by_size_fractionation_elementary_analysis_and_spectroscopic_methods.
Bishnoi, "Effects of Thermal Hydrolysis Pre-Treatment on Anaerobic Digestion of Sludge" Jul. 31, 2012, https://vtechworks.lib.vt.edu/bitstream/handle/10919/34539/Bishnoi_Pallavi_T_2012.pdf?sequence=1.
Mecholic, "Why Does the Viscosity of Liquids Decrease with Increasing Temperature, While that of Gases Increases with Increasing Temperature?" Jan. 26, 2016. http://www.mecholic.com/2016/01/effect-of-temperature-on-the-viscosity-of-liquids-and-gases.html.
Mecholic, "Why Does the Viscosity of Liquids Decrease with Increasing Temperature, While that of Gases Increases with Increasing Temperature?" Jan. 26, 2016. http://www.mecholic.com/2018/01/effect-of-temperature-on-the-viscosity-of-liquids-and-gases.html.
W.P.F. Barber, Thermal Hydrolysis for Sewage Treatment: A Critical Review, Water Research, 104, pp. 53-71, 2016.†
Muzammil Anjum et al., Wastewater Sludge Stabilization Using Pre-Treatment Methods, Process Safety and Environmental Protection, 102, pp. 615-632, 2016.†

† cited by third party

[1]Note: hydrolysis could including any individual or combination of acid, alkaline, thermal or e-beam hydrolysis

[1]Note: hydrolysis could including any individual or combination of acid, alkaline, thermal or e-beam hydrolysis

[1]Note: hydrolysis could including any individual or combination of acid, alkaline, thermal or e-beam hydrolysis

US 11,759,833 B2

METHOD AND APPARATUS FOR PASTEURIZATION, HYDROLYSIS AND CARBONIZATION

RELATED APPLICATIONS

This application is a divisional of U.S. patent application Ser. No. 15/713,278, filed Sep. 22, 2017, which claims priority to U.S. provisional application No. 62/398,936 entitled A Method and Apparatus for Pasteurization with Thermal Hydrolysis, filed Sep. 23, 2016, the entire disclosures of each are incorporated herein by reference in their entireties.

BACKGROUND

Thermal hydrolysis is now becoming a widely practiced technology to improve digestion rates (usually at temperatures greater than 100 degrees Celsius), and simultaneously pasteurize wastewater solids (or other wastes) and to decrease the viscosity of wastewater solids and other wastes. Combined thermal hydrolysis and pasteurization at a temperature greater than 100 degrees Celsius will henceforth be referred to as Thermal Hydrolysis. Other forms of hydrolysis include chemical hydrolysis (such as alkaline hydrolysis, acid hydrolysis), enzyme (natural or manufactured) hydrolysis and electron beam (E-Beam) hydrolysis. The individual form or combination (2 or more) of thermal, alkaline, acid, natural or manufactured enzyme, E-beam hydrolysis is generically henceforth called hydrolysis. Pasteurization can also be practiced at atmospheric pressure (henceforth simply referred to as pasteurization (60-100 degrees Celsius) to differentiate from high pressure thermal hydrolysis>100° C.). While the digestion rates and pasteurization can be increased by operating the process at lower temperatures and at atmospheric pressure, the viscosity reduction of some types of solids is best achieved at higher temperatures and pressures. Thermal Carbonization is the practice of heating sludge to temperatures (at different retention times) approximately greater than 180° C. under pressure and up to approximately 220° C., henceforth referred to as Thermal Carbonization. This disclosure relates to developing an approach to manage and co-mix streams of wastes by performing the thermal or hydrolysis treatment at one, two (or more) temperatures, depending on number of parallel or series waste streams, to achieve the optimized solution. The hydrolysis or pasteurization step can be replaced by a thermal carbonization step. Or, alternatively, some of these processes can be combined in a single step. For example, pasteurization and chemical hydrolysis can be combined in a single step. This way enhanced digestability and higher loading rate of solids can be achieved while minimizing requirement of volume of high pressure vessels and achieving overall pasteurization of all of the solids.

SUMMARY OF DISCLOSURE

In this disclosure, we propose the use of pasteurization, hydrolysis (inclusive of thermal hydrolysis) and/or carbonization at a plurality of temperatures and pressures in alternate waste streams in order to effectively achieve an optimal mix of high digestion rates and pasteurization rates while still achieving large viscosity reduction and high dewatered cake solids concentrations. This may be achieved through the use of separate waste streams feeding alternate Hydrolysis (or Thermal Carbonization) and Pasteurization processes before co-mixing.

In some embodiments of the present disclosure, waste activated sludge and primary sludge would feed a Thermal Hydrolysis (or Thermal Carbonization) and Pasteurization Process in parallel while being heat treated before being mixed in an Anaerobic digester and ultimately dewatered such that the end cake product is separated from the residual centrate/filtrate. In other embodiments, while the sludge would feed the treatment processes in series, the heat input would occur in parallel in the Thermal Hydrolysis and Pasteurization process. In some other embodiments, a heat exchanger would connect the Thermal Hydrolysis (or Thermal Carbonization) process to the Pasteurization process such that only the mass of the sludge is treated in parallel by each process, while the heat transfer occurs prior to the digester. In some such embodiments the heat exchange connection will still exist between Thermal Hydrolysis (or Thermal Carbonization) and Pasteurization, however the Thermal Hydrolysis (or Thermal Carbonization) mass flow will also be in series with Pasteurization such that neither mass nor heat flow in parallel. In yet other embodiments, optional blending may be used in lieu of the forced anaerobic digester, such that each parallel process can go through dewatering separately prior to cake digestion, and centrate/filtrate separation. Finally a mix of the aforementioned variations is envisioned in the present disclosure.

There may further exist other reactions within the spirit of the present disclosure not explicitly described herein.

BRIEF DESCRIPTION OF THE DRAWINGS

The accompanying drawings which are incorporated in and form a part of the specification, illustrate several embodiments of the present disclosure wherein.

It is envisioned that devices and systems illustrated in FIGS. 4-11 may be preceded by a thickening or dewatering device in certain embodiments. The dewatering step can also be a final step immediately after hydrolysis or carbonization.

DETAILED DESCRIPTION

Figure 1:
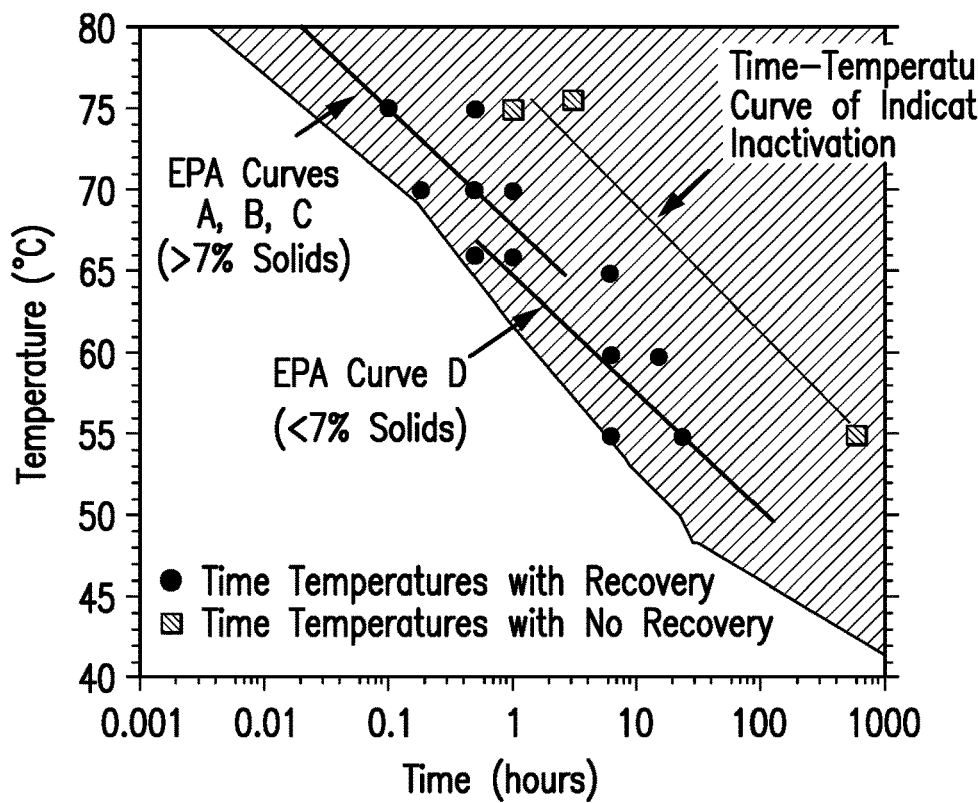
FIG. 1 is a graph depicting Time vs Temperature for solids post-Thermal Hydrolysis (or Thermal Carbonization) process (THP) with or without recovery as shown where t=time in hours, and Temp=temperature in degrees Celsius.

Some of the preferred embodiments of the present disclosure are illustrated in the attached drawings:

FIG. 1 is a graph depicting Time vs Temperature for solids post-Thermal Hydrolysis (or Thermal Carbonization) process with or without recovery as shown where t=time in hours, and Temp=temperature in degrees Celsius.

Figure 2:
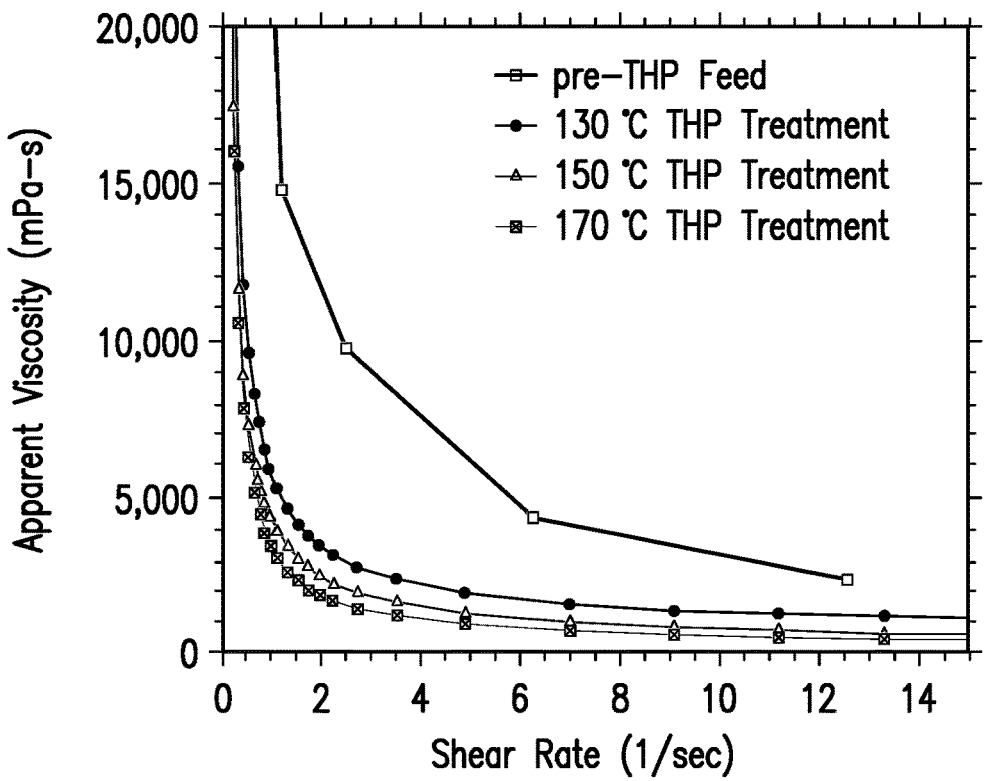
FIG. 2 is a graph showing the apparent viscosity profiles for solids concentration of about 10.5% before and after THP where treatment is at 130, 150, or 170 degrees C. respectively.

FIG. 2 is a graph showing the apparent viscosity profiles for solids concentration of about 10.5% before and after THP where treatment is at 130, 150, or 170 degrees C. respectively.

Figure 3:
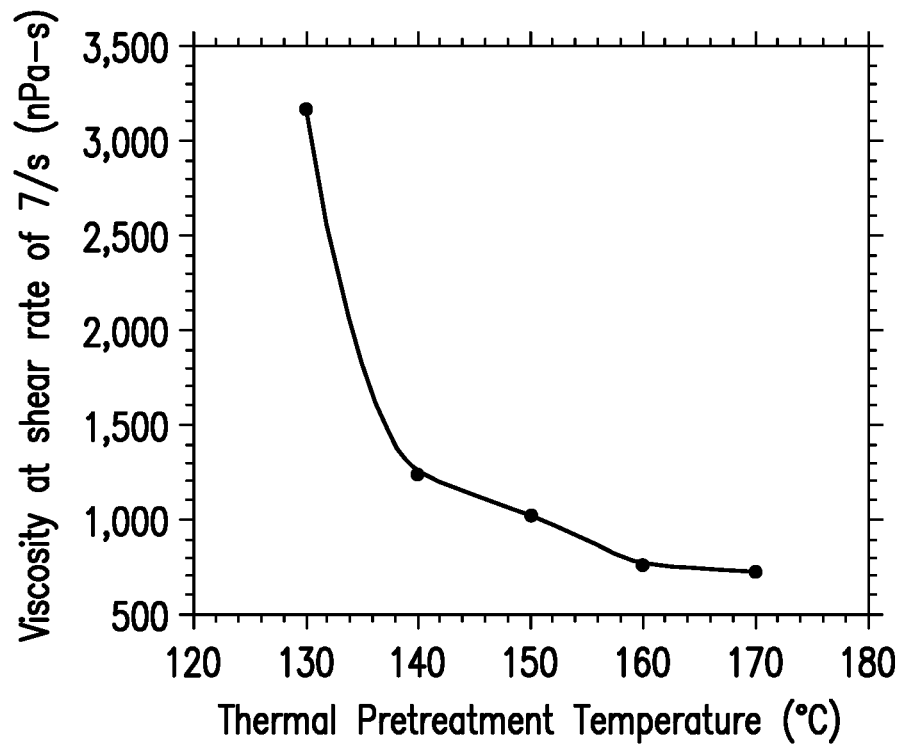
FIG. 3 is a graph representing the Thermal Pretreatment Temperature in degrees C. vs Viscosity at a shear rate of 7/s (mPa-s).

FIG. 3 is a graph representing the Thermal Pretreatment Temperature in degrees Celsius versus Viscosity at a shear rate of 7/s (mPa-s).

Figure 4:
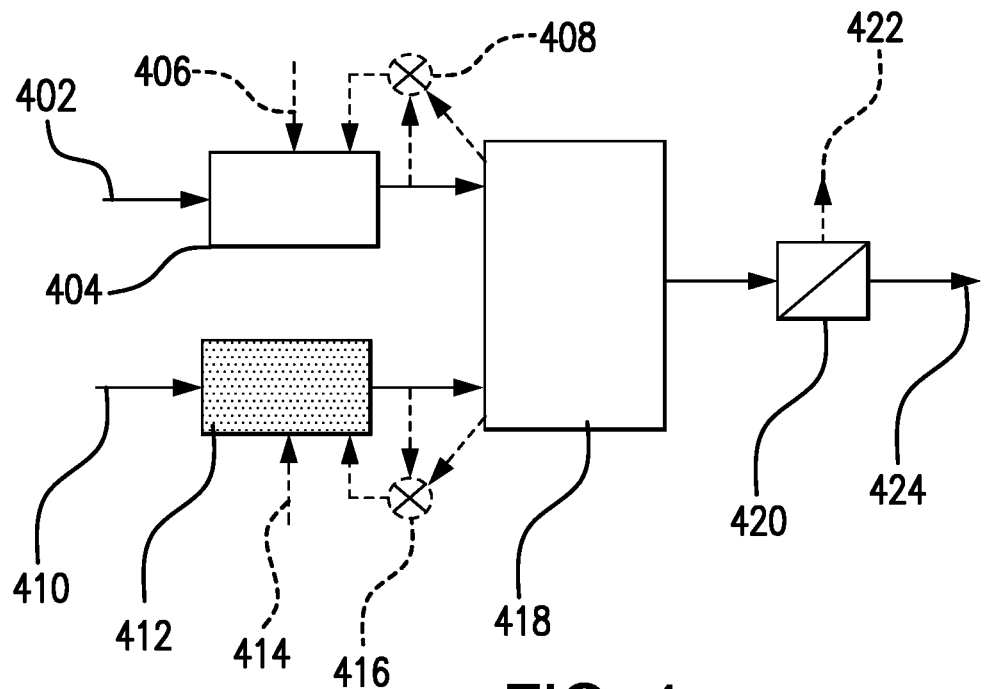
FIG. 4 is a flowchart depicting waste activated sludge and primary sludge feeding a Thermal Hydrolysis (or Thermal Carbonization) and Pasteurization process in parallel while being heat treated before being mixed in an anaerobic digester and ultimately dewatered such that the end cake product is separated from the residual centrate/filtrate.

FIG. 4 is a flowchart depicting waste activated sludge 402 feeding a Thermal Hydrolysis (or Thermal Carbonization) 404 as Heat Input is provided 406 and a heat exchanger cycles residual heat 408. Simultaneously, Primary Sludge 410 feeds a Pasteurization process 412 in parallel as Heat Input is provided 414 and a heat exchanger cycles residual heat 416 before being mixed in an Anaerobic Digester 418 (which also sends residual heat to the aforementioned heat exchangers 408, 416) and sent to dewatering 420 so that the end cake produced 422 is separated from the residual centrate/filtrate 424.

Figure 5:
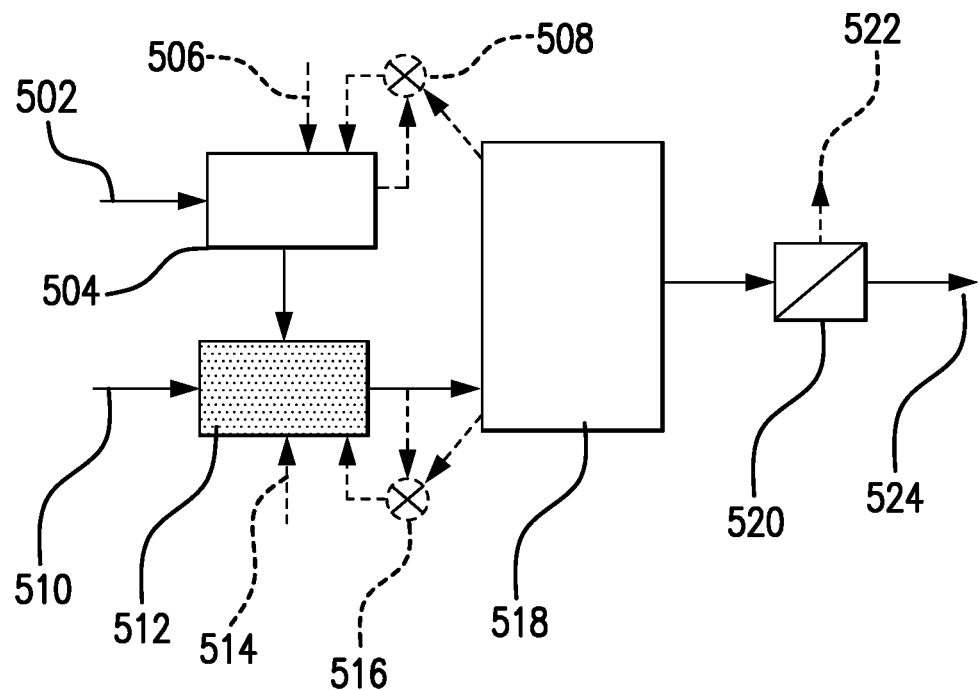
FIG. 5 is a flowchart showing waste activated sludge feeding a Thermal Hydrolysis (or Thermal Carbonization) and simultaneously primary sludge fed Pasteurization process in series, as heat input occurs in parallel in the Thermal Hydrolysis (or Thermal Carbonization) and Pasteurization process.

FIG. 5 is a flowchart depicting waste activated sludge 502 feeding a Thermal Hydrolysis (or Thermal Carbonization) 504 as Heat Input is provided 506 and a heat exchanger cycles residual heat 508 before the sludge is sent to Pasteurization 512 in series. Simultaneously, Primary Sludge 510 feeds the Pasteurization process 512 as Heat Input is provided 514 and a heat exchanger cycles residual heat 516 before being mixed in an Anaerobic Digester 518 (which also sends residual heat to the aforementioned heat exchangers 508, 516) and sent to dewatering 520 so that the end cake produced 522 is separated from the residual centrate/filtrate 524.

Figure 6:
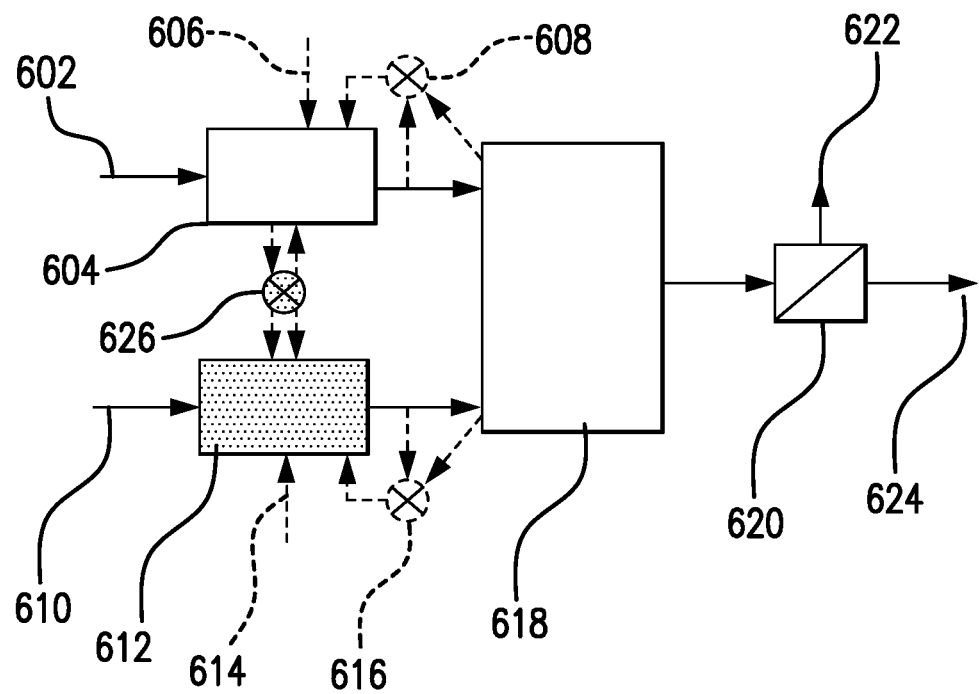
FIG. 6 is a flowchart representing waste activated sludge and primary sludge feeding a Thermal Hydrolysis (or Thermal Carbonization) and Pasteurization process in parallel while a heat exchanger connects the Thermal Hydrolysis (or Thermal Carbonization) process to the Pasteurization process such that only the mass of the sludge is treated in parallel by each process, while the heat transfer occurs prior to the anaerobic digester.

FIG. 6 is a flowchart representing waste activated sludge 602 feeding a Thermal Hydrolysis (or Thermal Carbonization) 604 as Heat Input is provided 606 and a heat exchanger cycles residual heat 608. Simultaneously, Primary Sludge 610 feeds a Pasteurization process 612 in parallel as Heat Input is provided 614 and a heat exchanger cycles residual heat 616 before being mixed in an Anaerobic Digester 618 (which also sends residual heat to the aforementioned heat exchangers 608, 616) and sent to dewatering 620 so that the end cake produced 622 is separated from the residual centrate/filtrate 624. Heat is balanced between the parallel thermal hydrolysis (or thermal carbonization) 604 and Pasteurization 612 processes through the use of a heat exchanger 626 directly connecting the two.

Figure 7:
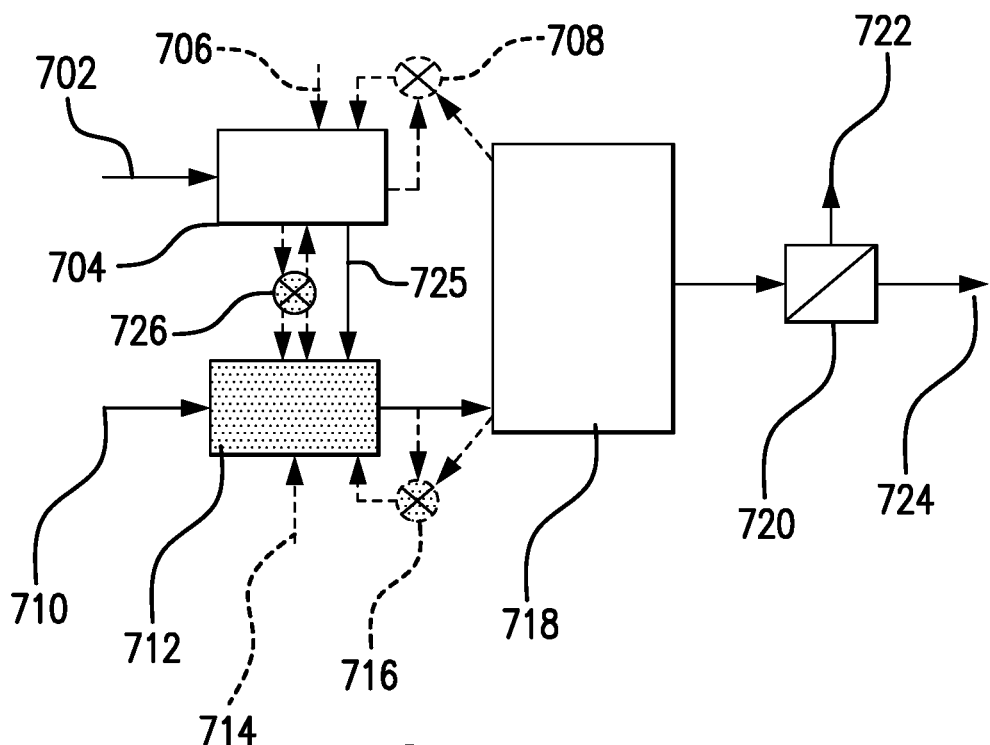
FIG. 7 is a flowchart displaying waste activated sludge feeding a Thermal Hydrolysis (or Thermal Carbonization) and simultaneously primary sludge fed Pasteurization process in series, as heat input occurs in parallel in the Thermal Hydrolysis (or Thermal Carbonization) and Pasteurization process while a heat exchanger connects the Thermal Hydrolysis (or Thermal Carbonization) process to the Pasteurization process such that neither the sludge treatment nor the heat transfer occur in parallel prior to the anaerobic digester.

FIG. 7 is a flowchart displaying waste activated sludge 702 feeding a Thermal Hydrolysis (or Thermal Carbonization) 704 as Heat Input is provided 706 and a heat exchanger cycles residual heat 708 before the sludge is sent 725 to Pasteurization 712 in series. Simultaneously Primary Sludge 710 feeds the Pasteurization process 712 as Heat Input is provided 714 and a heat exchanger cycles residual heat 716 before being mixed in an Anaerobic Digester 718 (which also sends residual heat to the aforementioned heat exchangers 708, 716) and sent to dewatering 720 so that the end cake produced 722 is separated from the residual centrate/filtrate 724. Heat is also balanced between the parallel THP 704 and Pasteurization 712 processes through the use of a heat exchanger 726 directly connecting the two so that neither mass nor heat truly run in parallel in this embodiment.

Figure 8:
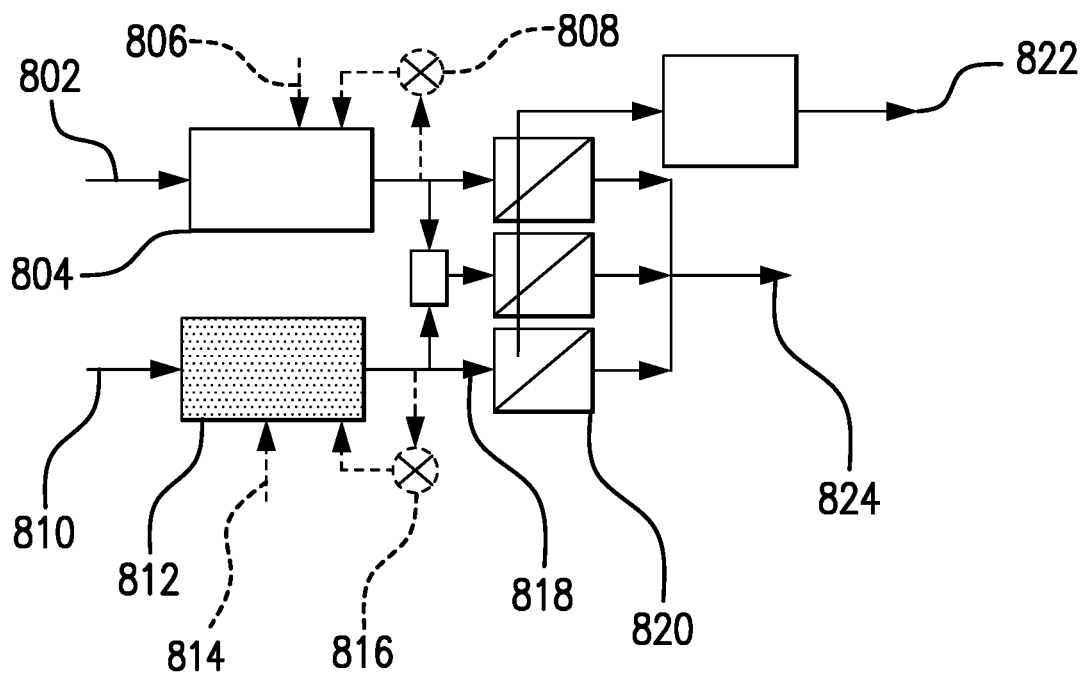
FIG. 8 is a flowchart presenting waste activated sludge and primary sludge feeding a Thermal Hydrolysis (or Thermal Carbonization) and Pasteurization process, respectively, in parallel while being heat treated before being mixed in an optional blending tank or remaining in parallel before being ultimately dewatered such that the cake is further anaerobically digested while separated first from the residual centrate/filtrate.

FIG. 8 is a flowchart presenting waste activated sludge 802 feeding a Thermal Hydrolysis (or Thermal Carbonization) 804 as Heat Input is provided 806 and a heat exchanger cycles residual heat 808. Simultaneously, Primary Sludge 810 feeds a Pasteurization process 812 in parallel as Heat Input is provided 814 and a heat exchanger cycles residual heat 816 before being mixed in an optional blending tank 818 or remaining in parallel before being sent to dewatering in either case 820 such that the cake digestion process final cake product 822 is separated from the residual centrate/filtrate 824.

Figure 9:
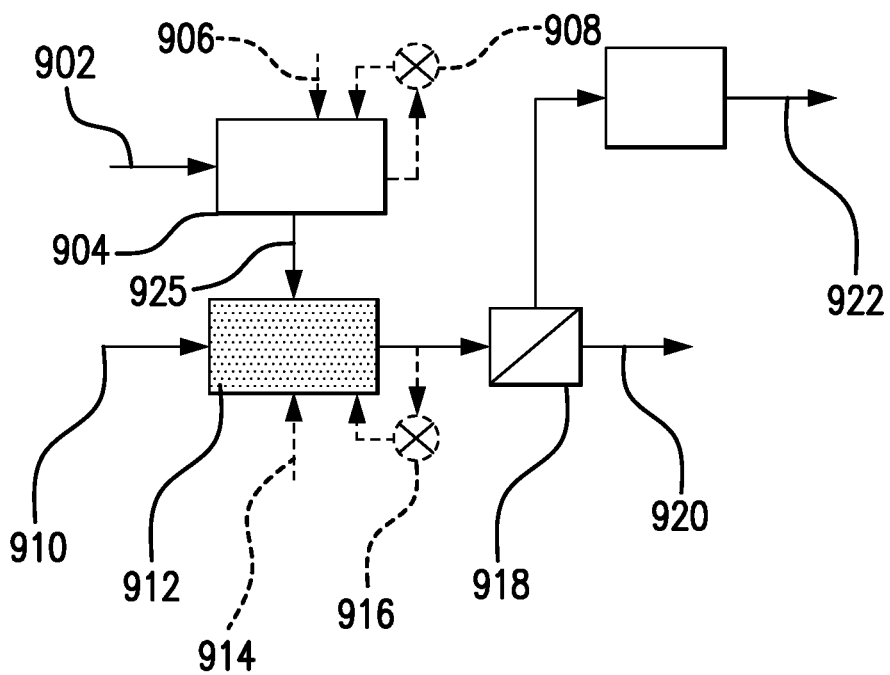
FIG. 9 is a flowchart depicting waste activated sludge feeding a Thermal Hydrolysis (or Thermal Carbonization) and simultaneously primary sludge fed Pasteurization process in series, as heat input occurs in parallel in the Thermal Hydrolysis (or Thermal Carbonization) and Pasteurization process prior to the mix being dewatered and the cake is further anaerobically digested while separated first from the centrate/filtrate.

FIG. 9 is a flowchart depicting waste activated sludge 902 feeding a Thermal Hydrolysis (or Thermal Carbonization) 904 as Heat Input is provided 906 and a heat exchanger cycles residual heat 908 before the sludge is sent 925 to Pasteurization 912 in series. Simultaneously, Primary Sludge 910 feeds the Pasteurization process 912 as Heat Input is provided 914 and a heat exchanger cycles residual heat 916 prior to the mix being sent to dewatering 918 and the centrate/filtrate 920 separated from the cake digestion processes final cake product 922.

Figure 10:
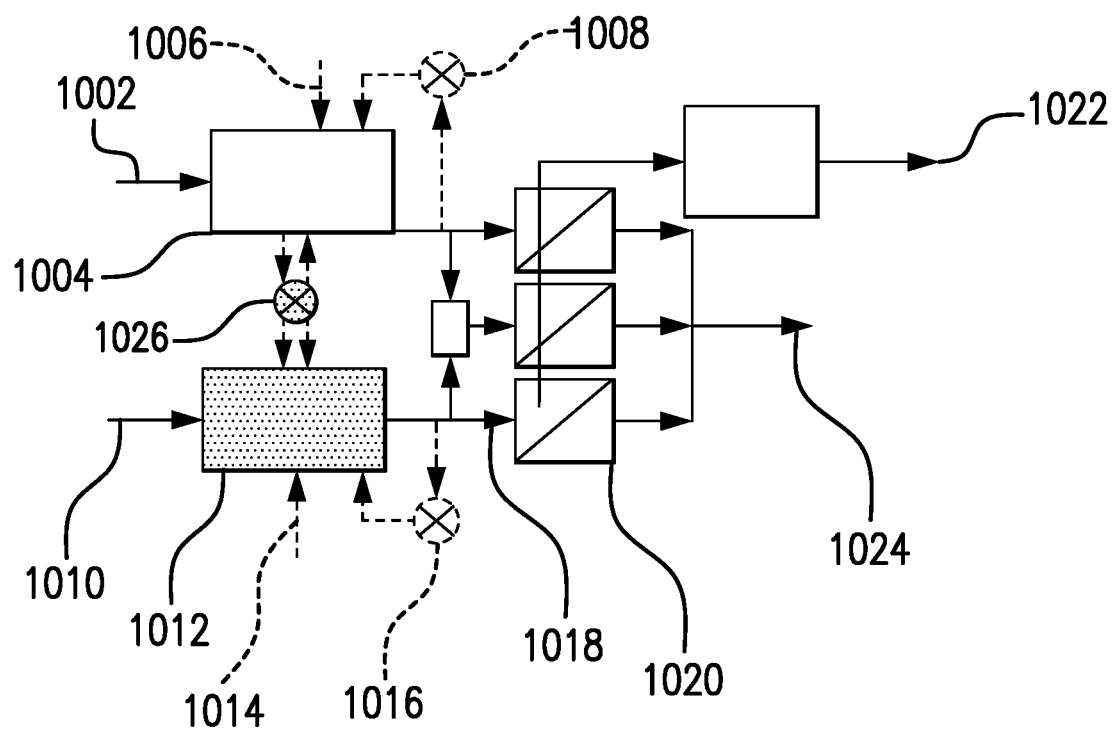
FIG. 10 is a flowchart illustrating waste activated sludge and primary sludge feeding a Thermal Hydrolysis (or Thermal Carbonization) and Pasteurization process in parallel while a heat exchanger connects the Thermal Hydrolysis (or Thermal Carbonization) process to the Pasteurization process such that only the mass of the sludge is treated in parallel by each process, while the heat transfer occurs prior to being mixed in an optional blending tank or remaining in parallel before being ultimately dewatered such that the cake is further anaerobically digested while separated first from the centrate/filtrate.

FIG. 10 is a flowchart illustrating waste activated sludge 1002 feeding a Thermal Hydrolysis (or Thermal Carbonization) 1004 as Heat Input is provided 1006 and a heat exchanger cycles residual heat 1008. Simultaneously, Primary Sludge 1010 feeds a Pasteurization process 1012 in parallel as Heat Input is provided 1014 and a heat exchanger cycles residual heat 1016 before being mixed in an optional blending tank 1018 or remaining in parallel before being sent to dewatering in either case 1020 such that the cake digestion process final cake product 1022 is separated from the residual centrate/filtrate 1024. Heat is balanced between the parallel THP 1004 and Pasteurization 1012 processes through the use of a heat exchanger 1026 directly connecting the two.

Figure 11:
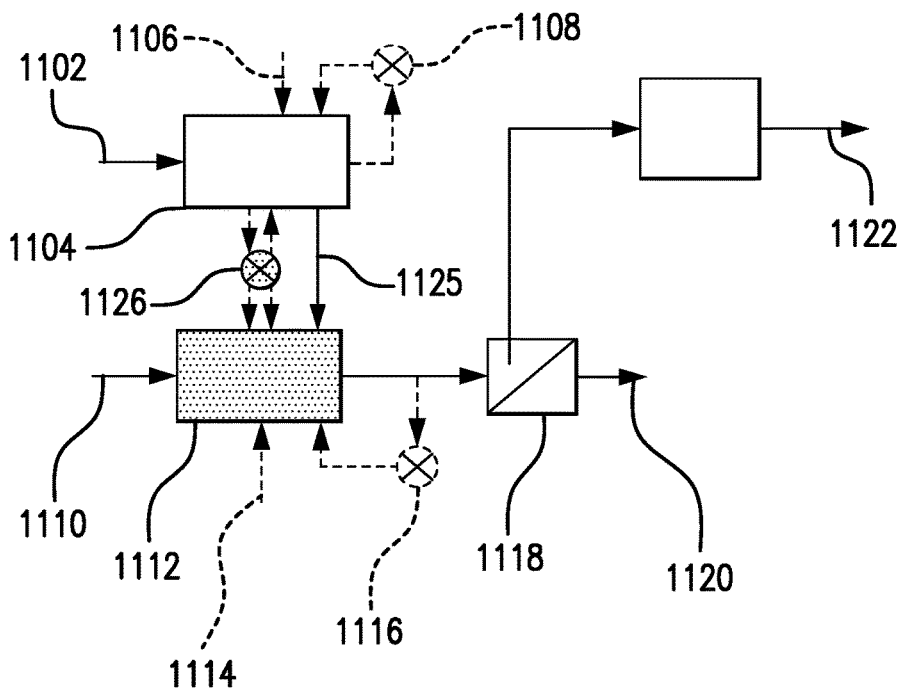
FIG. 11 is a flowchart depicting waste activated sludge feeding a Thermal Hydrolysis (or Thermal Carbonization) and simultaneously primary sludge fed Pasteurization process in series, as heat input occurs in parallel in the Thermal Hydrolysis (or Thermal Carbonization) and Pasteurization process while a heat exchanger connects the Thermal Hydrolysis (or Thermal Carbonization) process to the Pasteurization process such that neither the sludge treatment nor the heat transfer occur in parallel prior to the mix being dewatered and the cake is further anaerobically digested while separated first from the centrate/filtrate.

FIG. 11 is a flowchart depicting waste activated sludge 1102 feeding a Thermal Hydrolysis (or Thermal Carbonization) 1104 as Heat Input is provided 1106 and a heat exchanger cycles residual heat 1108 before the sludge is sent 1125 to Pasteurization 1112 in series. Simultaneously, Primary Sludge 1110 feeds the Pasteurization process 1112 as Heat Input is provided 1114 and a heat exchanger cycles residual heat 1116 prior to the mix being sent to dewatering 1118 and the centrate/filtrate 1120 separated from the cake digestion processes final cake product 1122. Heat is also balanced between the parallel THP 1104 and Pasteurization 1112 processes through the use of a heat exchanger 1126 directly connecting the two so that neither mass nor heat truly run in parallel in this embodiment.

Figure 12:
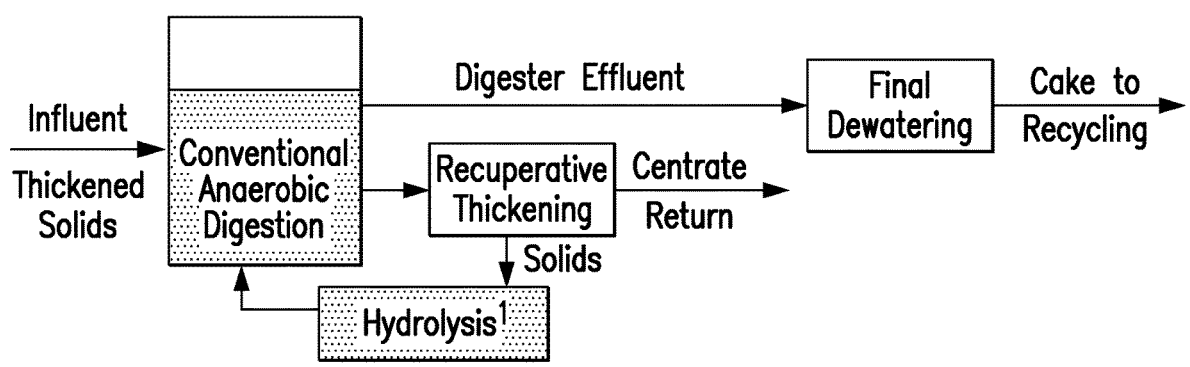
FIG. 12 is a flowchart that shows an implementation of hydrolysis (thermal, alkaline, acid, E-Beam or a combination thereof) associated with recuperative thickening. Influent solids are optionally pasteurized or optionally thickened and optionally added directly to digestion, or, upstream or downstream of the hydrolysis or recuperative thickening process.

FIG. 12 is a flowchart showing an implementation of hydrolysis (thermal, alkaline, acid, E-Beam or a combination thereof) associated with recuperative thickening. Influent solids are optionally pasteurized or optionally thickened and optionally added directly to digestion, or, upstream or downstream of the hydrolysis or recuperative thickening process.

Figure 13:
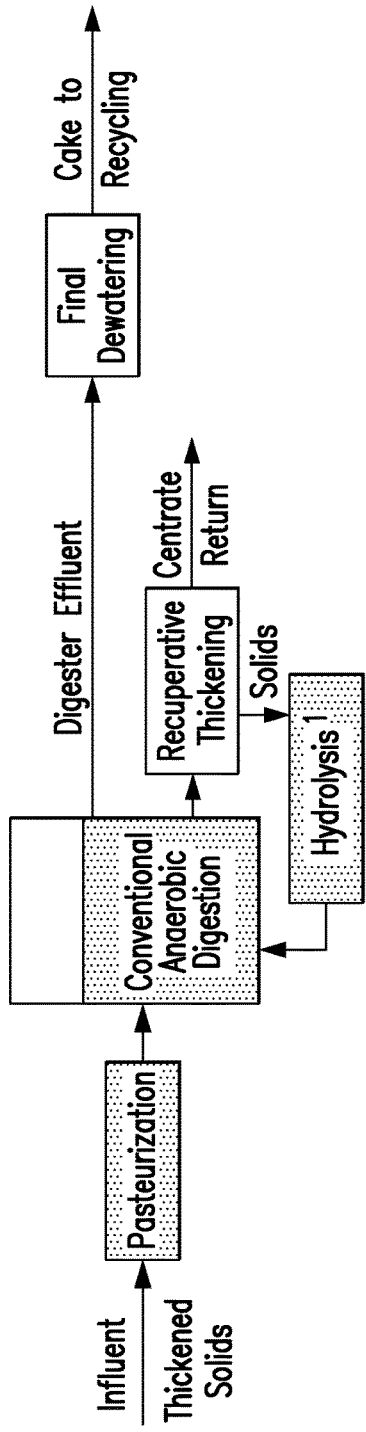
FIG. 13 is a flowchart showing an implementation of pre-pasteurization and hydrolysis (thermal, alkaline, acid, E-Beam or a combination thereof) associated with recuperative thickening. In this case, the influent thickened solids are optionally sent partly or fully to pasteurization and the remainder is sent to a digester either upstream or downstream of a hydrolysis step.

FIG. 13 is a flowchart showing an implementation of pre-pasteurization and hydrolysis (thermal, alkaline, acid, E-Beam or a combination thereof) associated with recuperative thickening. In this case, the influent thickened solids are optionally sent partly or fully to pasteurization and the remainder is sent to a digester either upstream or downstream of a hydrolysis step.

Figure 14:
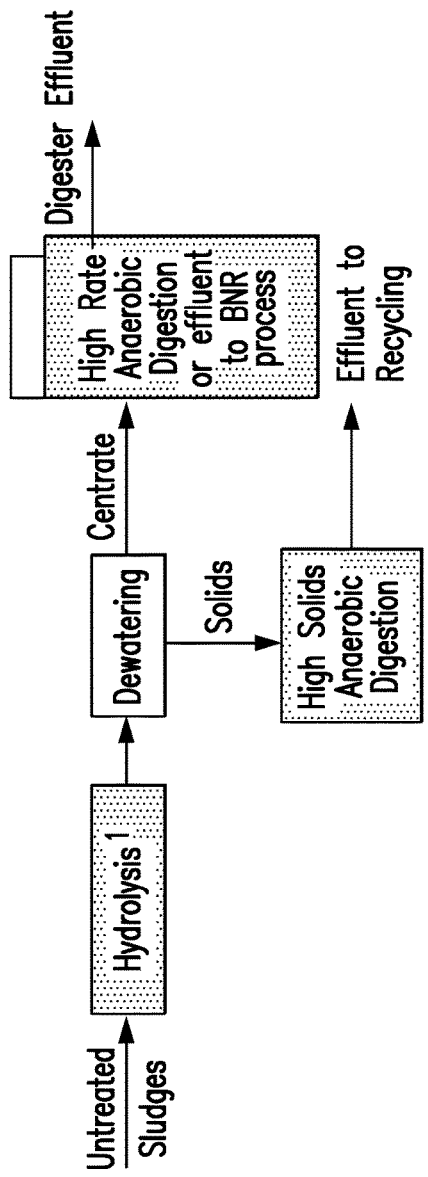
FIG. 14 is a flowchart showing an implementation of pre-digestion hydrolysis (thermal, alkaline, acid, E-Beam or a combination thereof) with separate solids and liquid digestion.

FIG. 14 is a flowchart showing an implementation of pre-digestion hydrolysis (thermal, alkaline, acid, E-Beam or a combination thereof) with separate solids and liquid digestion.

Figure 15:
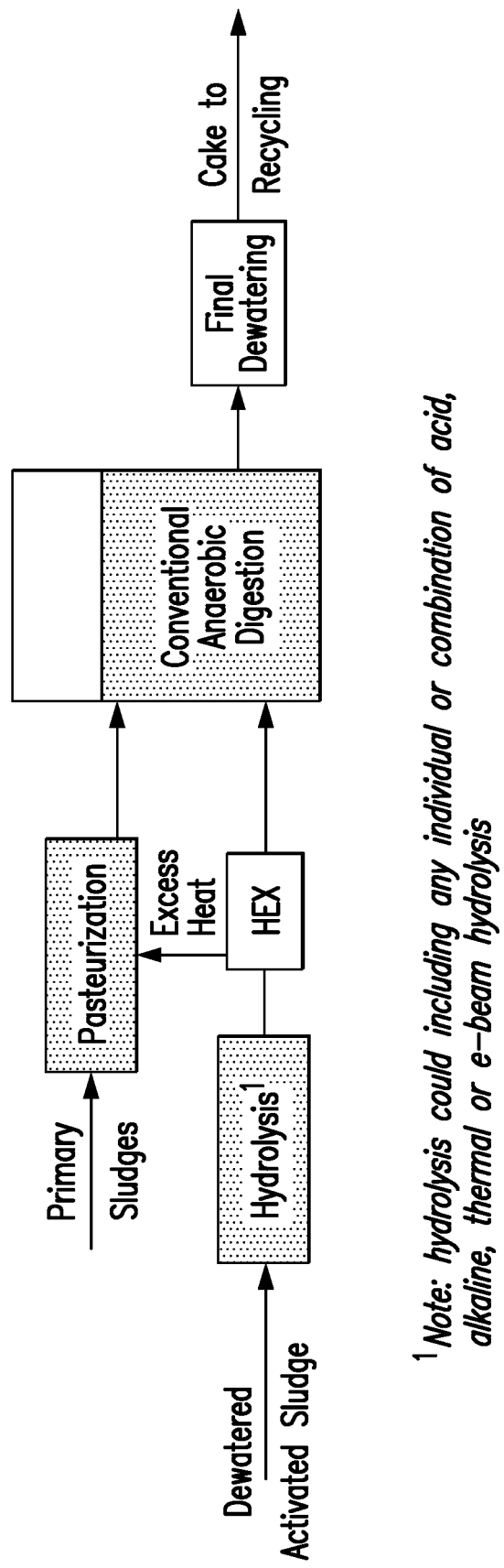
FIG. 15 is a flowchart that shows pasteurization and hydrolysis (thermal, alkaline, acid, E-Beam or a combination thereof) before anaerobic digestion.

FIG. 15 is a flowchart that shows pasteurization and hydrolysis (thermal, alkaline, acid, E-Beam or a combination thereof) before anaerobic digestion.

It is envisioned that devices and systems illustrated in FIGS. 4-11 may be preceded by a thickening or dewatering device in certain embodiments. The pasteurization process in the above figures can be replaced with a hydrolysis or thermal carbonization process, or combined with hydrolysis. Utility of the proposed components for these embodiments is described in more detail below:

Reactors and Process Streams: The solids are heated in reactors. The heat for pasteurization or hydrolysis can be provided using solar cells that can directly or indirectly heat sludge. The fluid can be air, water or other heat transfer material. The reactor can be operated as a continuous flow through process, a batch process, a sequencing batch process, or a plug-flow process. Any pressurized solids can be depressurized either slowly or rapidly. The reactor can be heated using steam, heat exchangers or heat pumps, and pressurized using solar, thermal, hydraulic or mechanical approaches. Single or multiple reactors can be included within two or more influent heat and/or mass flow streams that are either fully in parallel or are in series (such as a tributary) to an overall heat and/or mass flow stream or in combination of parallel or series as desired. The heat and mass flows streams can be uncoupled as desired. For example, the heat stream could flow in as a tributary for a fully parallel mass flow stream.

Proposed Treatment Temperature for Reactors: This disclosure proposes a method or apparatus wherein the temperature of wastewater solids (or other products and wastes) is increased between 60 and 220 degrees Celsius (<180° C. is thermal hydrolysis and >180° C. is thermal carbonization) to increase feed solids concentration to anaerobic digestion, decrease digester volume requirements, increase throughput rates of anaerobic treatment, increase cake solids, improve microbial hydrolysis rates, inactivate pathogens or indicators, or decrease head loss, mixing or pumping energy, and reduce viscosity of the solids. Additional hydrolysis (chemical (acid, alkaline or other compounds), manufactured enzyme, naturally produced enzyme (such as through aerobic thermophilic pretreatment), or E-beam) or a combination of approaches can be mixed in to achieve desired performance and much lower temperatures than those typically preferred (100° C.-180° C.) for thermal hydrolysis. In one approach of this method or apparatus, more viscous or more slowly hydrolysable solids such as waste activated sludge, cellulosic waste, or slowly digestible organic waste is thermally (or by other forms or combinations of hydrolysis) hydrolyzed at higher temperatures between 60 and 180 degrees Celsius (or up to 220° C. for thermal carbonization) and the more easily hydrolysable (non-rate limiting solids) materials, such as primary solids, food waste or any other organic waste or products is pasteurized at lower temperatures between 60 and 100 degrees Celsius. More than two streams with multiple wastes and temperatures are also possible. This approach allows for managing and optimizing the use of temperature and heat for the two streams and to simultaneously achieve optimized reductions in viscosity (and thereby increased process throughput rates), while achieving pasteurization, increased digestion rates and/or increased dewatered cake solids. The two (or multiple) streams could be in parallel or series of each other, with the possibility of heat transfer/sharing or stream mixing. In the case of a series approach, the lower temperature stream is usually pasteurized downstream of the higher temperature stream (with mass or heat transfer occurring between the two (or multiple) streams).

Proposed Viscosity Characteristics: The higher viscosity solids (approximately >2500 mPa-s when operated at a solids concentration of about 10%, a temperature of about 20° C., and a shear rate of 7 s-1) or less hydrolysable/digestible solids (requiring an overall anaerobic solids retention time approximately greater than 5-7 days) are typically heated to higher temperatures (and its corresponding pressure) of 100 to 180 degrees Celsius (or 220° C. for thermal carbonization) or undergo other forms of hydrolysis (alkaline, acid, enzymic (externally manufactured (at a manufacturing process for such production) or naturally produced), E-Beam). Lower viscosity solids (approximately <3500 mPa-s when operated at a solids concentration of about 10%, a temperature of about 20° C., and a shear rate of 7 s-1) are typically heated to lower temperatures of 60 to 100 degrees Celsius. Solids in between 2500 mPa-s and 3500 mPa-s can be heated in either of the two approaches to create the appropriate 'mix' of viscosity characteristics for anaerobic digestion.

Proposed Thickened/Dewatered Solids Concentration: The solids are typically pre-thickened or dewatered to approximately 3-15% (more than 3%) solids before the heat 'reactions'. Solids of 35% (much higher than 3-15%) are possible. After the heating reaction, the solids can be either diluted, thickened or dewatered to a solids concentration of between 7-55%, the higher solids concentration occurring to promote 'dry digestion'. For the special case of dry digestion, a single stream is permitted (a multiple mix stream is not needed), where the thickening/dewatering step occurs between the heating reactors and the drying/digestion process. The filtrate or centrate liquor obtained after thickening/dewatering (when thickening or dewatering occurs between 'heating reactors' and 'digestion' steps) can be used as a carbon source for biological nutrient removal or anaerobic digestion as needed. The thickening/dewatering that occurs before the heating step could allow for concomitant phosphorus release in the filtrate or centrate, if desired. Dewatering can also be the final step of the overall process (without including a digestion step thereafter).

In another embodiment, the stream for the high-temperature hydrolysis (or carbonization) process is dewatered to a solids concentration of >8%, while the stream for the pasteurization process is thickened to a solids concentration<8% in order to manage the relative viscosities and the heat balances of the two streams.

In some embodiments of the present disclosure, a heat generator can regulate higher temperatures of 135 to 180 degrees Celsius as reserved for the higher viscosity solids or less digestible solids.

In an another approach to manage the solids concentration, a portion of the solids is sent to the pre-treatment involving high temperature, and high solids concentration is controlled in order to match a pre-defined hydraulic retention time in the down-stream anaerobic digester. Dilution water can be added to additionally manage the solids concentration and/or hydraulic retention time. This management of the solids concentration and time will allow for the achievement of stable digestion. In some embodiments, the management of solids concentration and dilution will address inhibition (such as from ammonia) or toxicity.

Proposed use of the filtrate or centrate (after the heating reaction). The removed liquid of the dewatering process can consist of refractory material or a substance that is produced during the thermal hydrolysis or carbonization processes. The liquid can be harvested as a sterilized product for agriculture, fermentation feed stock, antimicrobial blends or for chelation. The removed liquid of the dewatering process can comprise humic and fulvic substances. The removed liquid could consist of inhibitors or growth promoters of bacteria for selecting specific reactions within microbial cycles. The production of these constituents (such as chelators or other inhibitors) in the liquid can be controlled using sensors (such as ultraviolet (UV) scan, UV, Raman, infrared, FTIR, or other forms of spectroscopy). This control can thus manage (through feedback control using a sensor that controls a pump, valve or other devices), the temperatures used for the thermal hydrolysis or carbonization reactions. The thermal hydrolysis and carbonization reactions are expected, in many cases, to produce these refractory compounds at the very point of impact of high temperature steam or other heat exchange material (by scalding, scorching, charring or otherwise changing molecular structures of the sludge) on a sludge particle. The production of the refractory constituents can be decreased or mitigated by better 'direct heat' dissipation by any method available including the use of water baths, lower temperature steam baths, better mixing (flash mixing or other approaches of rapid mixing), or any other approaches that are available for such purpose of preventing the scalding, scorching, charring or otherwise changing molecular structures of the sludge.

The production of refractory substances (refractory material) during the thermal hydrolysis or carbonization processes can be managed or controlled using a sensor that controls a pump, valve or other devices. The production of refractory substances during thermal hydrolysis or carbonization can be minimized through more rapid heat dissipation using better mixing, heat transfer or heat management approaches.

In another embodiment, the temperature can be increased using solar energy or solar cells that directly or indirectly heat sludge.

Proposed use of thickened or dewatered solids. The sterilized solids can be bioaugmented with specialized micro-organisms prior to anaerobic digestion, prior to or after dewatering, or prior to agricultural use of solids. These microorganisms could comprise specialized bacteria or fungi (such as nitrogen fixers or *Trichoderma*) that could promote its agricultural use. The specialized microorganisms could also be specifically used to consume excess hydrogen in digesters, produce excess hydrogen in digesters, or to increase Firmicutes over Bacteroidetes ratio, or to increase anaerobic nitrogen fixation.

Recuperative Thickening: Recuperative thickening (the thickening of sludge in the recirculation loop of an anaerobic digester) is also possible as shown in some figures. The influent solids of the two streams can be added at different locations prior to the recuperative thickening process, hydrolysis process, pasteurization process or directly to digestion.

Pasteurization to address regrowth of indicators and pathogens: A minimum temperature of 75 degrees Celsius for about 30 minutes is usually required to address resuscitation and regrowth of indicators and pathogens, especially if approximately more than 3-4 logs ($10^3$-$10^4$ colony forming units/gram dry solids, $10^3$-$10^4$ most probable number/g dry solids, or $10^3$-$10^4$ unique DNA copies/g dry solids) of these organisms are present. Thermophilic or high temperature aerobic pretreatment (that can also improve hydrolysis) can also be used in lieu of, or in combination with, pasteurization.

Proposed approach to improve hydrolysis/particle destruction rates in anaerobic r digester: Microbial hydrolysis/particle destruction rates are improved by decreasing microbe to substrate (especially particulate substrate) proximity (by thickening/dewatering the solids), microbe-microbe proximity (by thickening/dewatering the solids), or increasing diffusivity through decreased viscosity (associated with destruction/release of structured or bound water). Forms of hydrolysis include thermal, chemical, enzymic or E-Beam or combinations thereof. Chemical hydrolysis can include, but is not limited to, acid or alkaline hydrolysis. Alkaline hydrolysis can include (but is not limited to) the use of potassium hydroxide, sodium hydroxide, calcium oxide/hydroxide or magnesium oxide/hydroxide or a combination of these chemicals. Acid hydrolysis can be achieved using naturally produced (VFA) or synthetic acids.

Proposed control of temperature based on viscosity characteristics. The pasteurization temperature can be controlled directly or indirectly based on viscosity characteristics of the solids. The viscosity could be measured directly or through indirect control based on head loss in pumps or torque in a mixer, or any such approach. Direct viscosity-based control can occur using an in-line or off-line or lab-measured viscosity value using a shear rate as required.

Proposed control of viscosity characteristics using solids dilution. Solids dilution or thickening is used to control viscosity of solids through direct or indirect viscosity measurement as desired. The viscosity could be measured directly or through indirect control based on head loss in pumps or torque in a mixer, or any such approach. Direct viscosity-based control can occur using an in-line or off-line or lab-measured viscosity value using a shear rate as required.

In some embodiments of the present disclosure, a refractory substance is produced. The production of refractory substances during the thermal hydrolysis or carbonization processes can be managed or controlled using a sensor that controls a pump, valve or other devices. The production of refractory substances during thermal hydrolysis or carbonization can be minimized through more rapid heat dissipation using better mixing, heat transfer or heat management approaches.

In another embodiment, the temperature can be increased using solar energy or solar cells that directly or indirectly heat sludge.

This disclosure also relates to a method for Hydrolysis (or Thermal Carbonization) treatment wherein temperature of wastewater solids is increased between 60 and 220 degrees Celsius to increase feed solids concentration to digestion, decrease digester volume requirements, increase throughput rates of anaerobic treatment, increase cake solids, improve microbial hydrolysis rates, inactivate pathogens or indicators, or decrease head loss, mixing or pumping energy, and that reduces viscosity of the solids, wherein the mostly waste activated sludge, cellulosic waste, slowly digestible organic waste is hydrolyzed (using thermal, thermophilic aerobic, chemical, enzyme, or electron beam) at temperatures between 60 and 180 degrees Celsius (or up to 220 degrees Celsius for thermal carbonization) and wherein the mostly primary solids, food waste or any other organic waste or products is pasteurized at temperatures between 60 and 100 degrees Celsius. The higher temperatures for hydrolysis or carbonization approaches are reserved for the higher viscosity solids or less digestible solids In some embodiments of the present disclosure, the solids produced after treatment are dewatered to increase cake solids of a content of 7-55% total dry solids prior to anaerobic digestion or composting of these solids.

In some embodiments of the present disclosure, the stream for the high-temperature hydrolysis process is dewatered to a solids concentration greater than approximately 8%, while the stream for the pasteurization process is thickened to a solids concentration less than approximately 8%.

In other embodiments, the portion of the solids sent to the pre-treatment involving high temperature and high solids concentration is controlled in order to match a predefined hydraulic retention time in the down-stream anaerobic digester.

In another embodiment, removed liquid of the dewatering process is used as a carbon source for biological nutrient removal, anaerobic digestion. The removed liquid of the dewatering process may be harvested as a sterilized product for agriculture, fermentation feed stock, antimicrobial blends, or chelation. The removed liquid of the dewatering process can increase breakdown of humic-towards fulvic substances if targeted.

In another embodiment, solids produced after additional anaerobic digestion are dewatered to increase cake solids to a content of 7-55% total dry solids.

In another embodiment, the solids produced before treatment are dewatered to increase cake solids of a content of 3-35% total dry solids.

In some embodiments of the present disclosure, a minimum temperature of 75 degrees Celsius for 20-40 minutes is required to prevent resuscitation and regrowth of indicator and pathogens.

In some embodiments of the present disclosure, the microbial hydrolysis rates are improved by decreasing microbe to substrate proximity, microbe-microbe proximity, or increasing diffusivity through decreased viscosity.

In another embodiment, the thermal hydrolysis time or pasteurization temperature is controlled directly or indirectly based on viscosity characteristics of the solids. The indirect control is based on head loss in pumps, torque in a mixer, and direct control is based on an in-line or off-line or lab-measured viscosity.

In another embodiment, solid dilution or thickening is used to control viscosity of solids.

The pasteurization process can use heat recovered from the Thermal Hydrolysis (or Thermal Carbonization) process by either mixing the solids streams or by using heat exchangers.

In some embodiments of the present disclosure, sterilized solids are bioaugmented with specialized micro-organisms to promote anaerobic digestion, dewatering and agricultural use of solids. The specialized micro-organisms may be used to consume hydrogen, to increase Firmicutes over Bacteroidetes ratio, or increase anaerobic nitrogen fixation.

It is understood that the various disclosed embodiments are shown and described above to illustrate different possible features of the disclosure and the varying ways in which these features may be combined. Apart from combining the features of the above embodiments in varying ways, other modifications are also considered to be within the scope of the disclosure. The disclosure is not intended to be limited to the preferred embodiments described above, but rather is intended to be limited only by the claims set out below. Thus, the disclosure encompasses all alternate embodiments that fall literally or equivalently within the scope of these claims.

The invention is not limited to the structures, methods and instrumentalities described above and shown in the drawings. The invention is defined by the claims set forth below.

What is claimed and desired to be protected by Letters Patent of the United States is:

1. A method of treating wastewater solids including waste activated sludge and primary sludge, comprising:
    using a first system to perform hydrolysis treatment on the waste activated sludge, wherein the step of using the first system includes using at least two or more hydrolysis approaches of thermal, thermophilic aerobic, chemical, alkaline, enzyme, or electron beam treatment, to thereby produce hydrolyzed sludge, wherein the first system includes a first system reactor, an input conduit for feeding the waste activated sludge into the reactor, and an output conduit for removing hydrolyzed sludge from the reactor;
    simultaneously, using a second system to pasteurize the primary sludge to temperatures less than 100 degrees Celsius, to thereby produce pasteurized sludge, wherein the second system includes a second system reactor, an input conduit for receiving the hydrolyzed sludge from the output conduit of the first system, and for feeding the hydrolyzed sludge into the second system reactor, and an output conduit for removing sludge from the second system reactor, and wherein the steps of using the first and second systems include operating the first and second systems in series by transporting the hydrolyzed sludge from the first system reactor to the second system reactor through the output conduit of the first system and the input conduit of the second system; and
    performing anaerobic digestion of the hydrolyzed sludge and the pasteurized sludge.

2. A method of treating wastewater solids, wherein the wastewater solids include a first waste stream and a second waste stream, the method comprising:
    using a reactor to decrease digester volume requirements, increase throughput rates of anaerobic treatment, increase cake solids dryness, improve microbial hydrolysis rates, inactivate pathogens or indicators, decrease head loss, decrease mixing or pumping energy requirements, or reduce viscosity, or produce a carbon source for biological nutrient removal,
    using first and second systems to perform hydrolysis treatment, wherein the step of using the first and second systems includes using at least two or more hydrolysis approaches of thermal, thermophilic aerobic, chemical, alkaline, enzyme, or electron beam assisted hydrolysis, wherein the first system is operated at a temperature between 60 and 180 degrees Celsius, or at a temperature up to 220 degrees for thermal carbonization or hydrolysis treatment, on the first waste stream, to thereby produce a hydrolyzed or carbonized waste stream, wherein the first system includes a first system reactor, an input conduit for feeding the first waste stream into the first system reactor, and an output conduit for removing the hydrolyzed or carbonized waste stream from the first system reactor, and
    using a second system to further hydrolyze or pasteurize the second waste stream, to thereby produce a pasteurized waste stream, wherein the second system includes a second system reactor, an input conduit for receiving the hydrolyzed or carbonized waste stream from the output conduit of the first system, and for feeding the hydrolyzed or carbonized waste stream into the second system reactor, and an output conduit for removing the pasteurized waste stream from the second system reactor, and wherein the steps of using the first and second systems include operating the first and second systems in series by transporting the hydrolyzed or carbonized waste stream from the first system reactor to the second system reactor through the output conduit of the first system and the input conduit of the second system.

* * * * *